Figure 1:
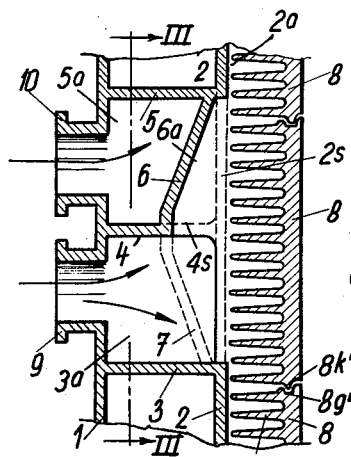

Dec. 29, 1959    J. JERIE ET AL    2,918,793
COOLED WALL OF A COMBUSTION CHAMBER
Filed June 13, 1956    3 Sheets-Sheet 1

INVENTORS
Jan Jerie, Zdeněk Pencl
BY

Dec. 29, 1959  J. JERIE ET AL  2,918,793
COOLED WALL OF A COMBUSTION CHAMBER
Filed June 13, 1956  3 Sheets-Sheet 2

INVENTORS
Jan Jerie, Zdeněk Fencl
BY Richard Low
Ag't

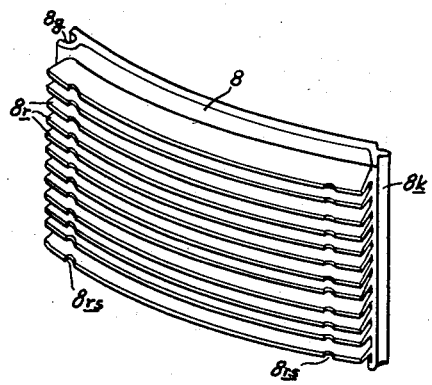
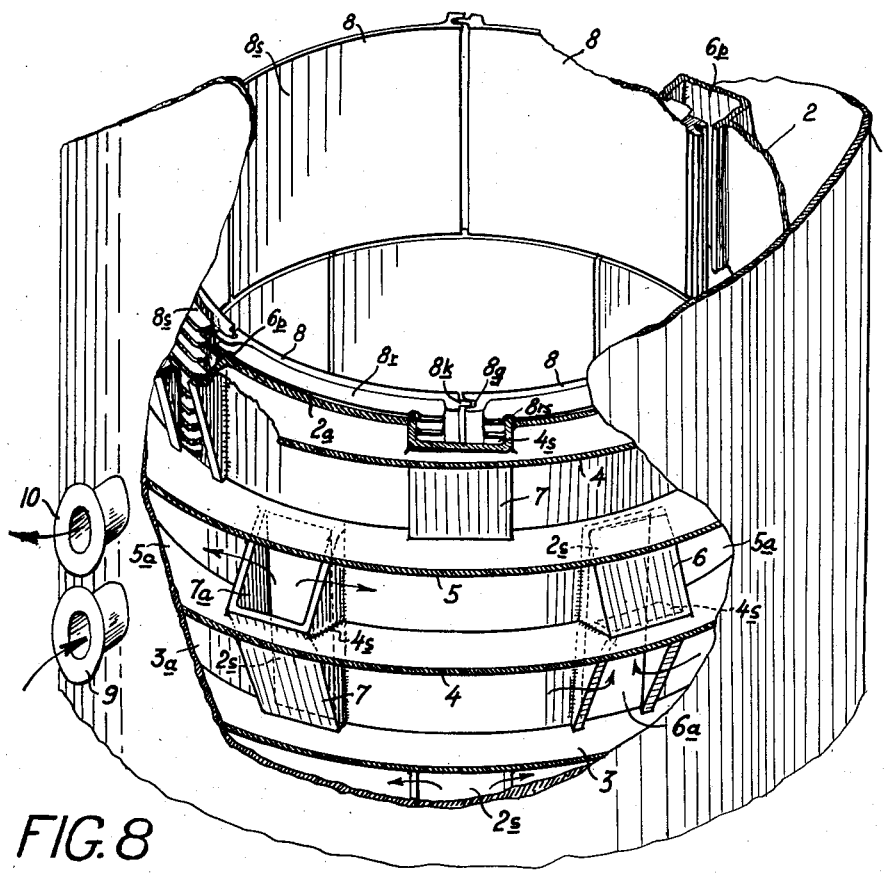

United States Patent Office

2,918,793
Patented Dec. 29, 1959

2,918,793

COOLED WALL OF A COMBUSTION CHAMBER

Jan Jerie and Zdeněk Fencl, Prague, Czechoslovakia

Application June 13, 1956, Serial No. 591,212

Claims priority, application Czechoslovakia June 16, 1955

6 Claims. (Cl. 60—39.66)

The present invention relates to a cooled metal wall of a combustion chamber.

Cooled metal walls made of a heat resisting material are used for the combustion chambers of gas turbines, although this results in substantially costlier designs than structures using ceramic walls. The increases in cost are accepted by reason of the fact that ceramic walls are gradually destroyed by the influence of varying temperatures and the separated particles then cause erosion in the turbine. A cooled metal wall has a number of further unfavorable properties besides its high cost. It requires the use of high alloyed heat resisting materials, including special row materials that are difficult to obtain. The temperature of the wall is determined by the heat balance between the supply of heat from the combustion zone and the withdrawal of heat by the cooling medium. The high temperature of the wall causes considerable thermal deformations and high additional stresses in the material, if the temperature is not uniformly distributed. The above mentioned disadvantages are increased in combustion chambers for heavy liquid fuels and coal powder, as the flame of such fuels is characterized by very high radiation effects.

The object of the present invention is to provide a cooled wall of a combustion chamber in which the above drawbacks of existing cooled metal walls are removed or substantially reduced. The main feature of a cooled wall of a combustion chamber according to the invention resides in the provision of a jacket carrying the cooled wall of the combustion chamber and formed by two shells which are connected together and reinforced by partitions extending therebetween and which ensure an advantageous distribution of the cooling medium by a system of channels and corresponding apertures in the shells of the jacket and opening towards the cooled wall to secure uniform cooling, while the cooling efficiency is increased by the known provision of suitable ribs on the cooling or outer surface of the cooled wall.

A further essential feature of the invention is the suppression of additional thermal stresses by dividing the cooled wall into individual sections and mounting them in such a way in the carrying jacket and with respect to each other as to permit their free expansion and contraction.

The basic idea of the invention offers an advantageous solution both for walls cooled by air flowing only over the outer surface of the cooled wall or at both sides of the wall defining the combustion space, for example, as in the case of a wall formed of deflectors with slits therebetween through which the cooling air can flow for addition to the products of combustion. In this connection it is very important that the jacket carrying the cooled wall may be made by welding together parts of currently used sheet metal, while the parts of the cooled wall itself may be cast from a heat resisting alloy which is available in ample supply.

Figure 3:
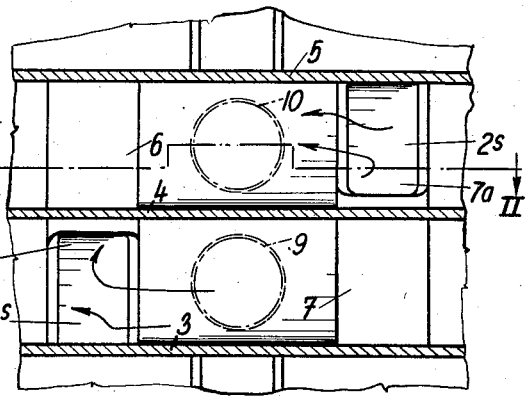
Figure 2:
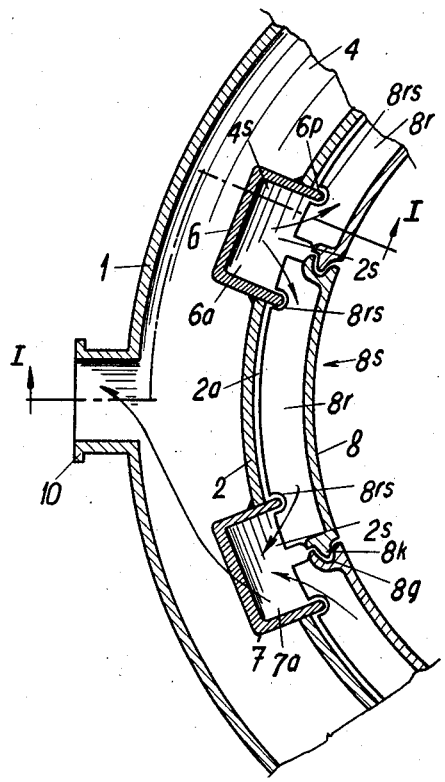
Figure 4:
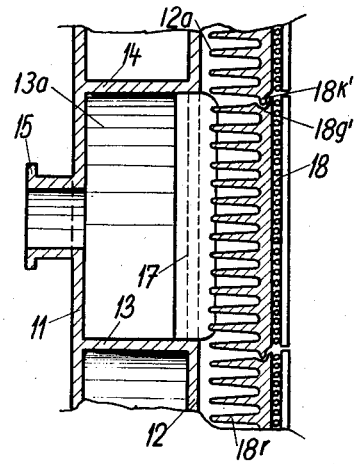
Figure 6:
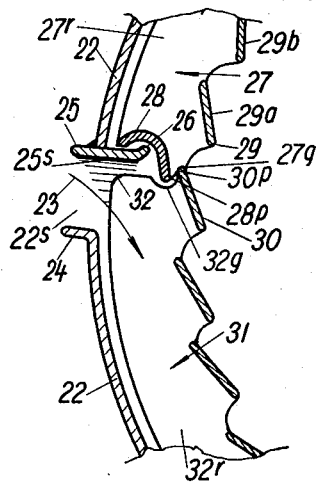
Figure 5:
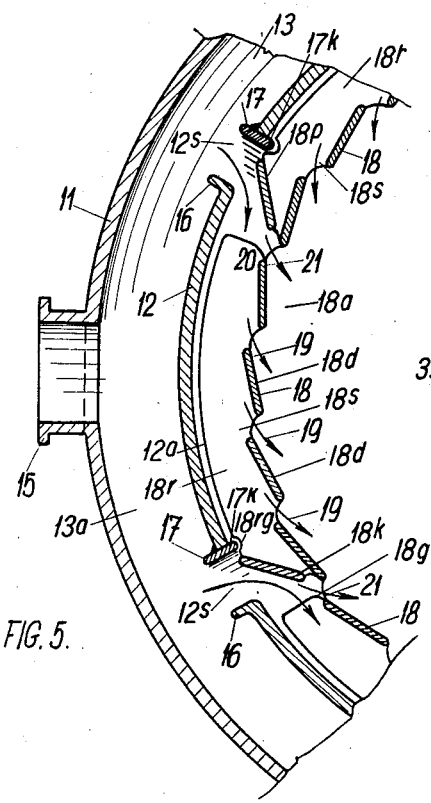
Figure 7:
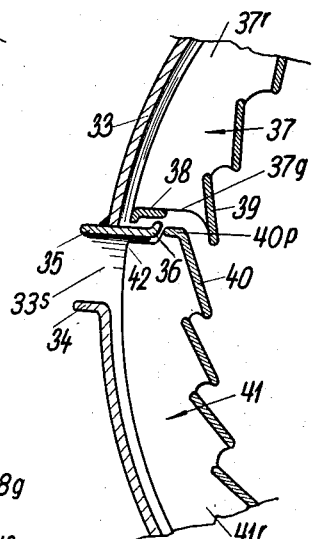

Examples of cooled walls of a combustion chamber according to the present invention are shown in the accompanying drawings, wherein:

Fig. 1 is a radial section through a part of a cylindrical wall according to the invention and taken along the line I—I of Fig. 2, Fig. 2 is a transverse section through this part of the wall in a plane perpendicular to the axis and taken along the line II—II of Fig. 1, Fig. 3 is a developed cylindrical section of the wall taken along the line III—III of Fig. 1, Fig. 4 is a sectional view similar to that of Fig. 1, but showing an embodiment of the invention wherein the wall of the combustion chamber is cooled at both sides, Fig. 5 is a sectional view similar to that of Fig. 2, but showing the construction of Fig. 4, Fig. 6 is a sectional view similar to that of Fig. 5, but showing another embodiment of the invention, Fig. 7 is a sectional view similar to that of Fig. 5, but showing still another embodiment of the invention, Fig. 8 is a fragmentary perspective view of a combustion chamber in accordance with the embodiment of Figs. 1, 2 and 3, with the outer shell being partly broken away, and Fig. 9 is a perspective view of a segment of the cooled wall in the embodiment of Figs. 1, 2 and 3.

Referring to Figs. 1, 2, 3, 8 and 9 it will be seen that, in the embodiment of the invention there illustrated, the carrying jacket consists of an outer cylindrical shell 1 and an inner cylindrical shell 2 which together with annular transverse partitions 3, 4 and 5 extending therebetween produce a system of annular channels 3a and 5a for the supply and withdrawal of cooling air to and from a space 2a between the inner shell 2 and a cooled wall 8 of a combustion chamber. The carrying structure thus produced is, of course, very rigid and relatively light. In the inner cylindrical shell 2 and in the central annular partition 4 slots 2s and 4s, respectively, are provided, and inclined partitions 6 and 7 (the latter appearing in broken lines in Fig. 1) form semiclosed ducts 6a and 7a communicating with these slots, so that the cooling space 2a between the inner wall 2 and the segments of the cooled wall 8 is in communication, through the ducts 6a, with the annular channel 3a and, through the ducts 7a, with the annular channel 5a. The duct 7a is formed in the same way as the duct 6a, with the exception that it opens in the opposite axial direction, as is apparent in Fig. 8. Thus, cooling air supplied to an inlet 9 in the outer shell 1 flows through the channel 3a and duct 6a into space 2a limited, at the inner side, by the wall segments 8 and, after having cooled these segments, the air leaves the space 2a through the duct 7a and the channel 5a for exhaust through an outlet 10. The arcuate wall sections or segments 8, which constitute the cooled wall defining the space 8s within the combustion chamber, are provided with ribs 8r on their outer surfaces, as is clearly shown in Fig. 9, to increase the effect of the cooling. The correct positioning of the wall segments 8 in the carrying jacket is achieved by simple centering means. In the embodiment of Figs. 1, 2, 3, 8 and 9, extended portions 6p are provided on the partition 6 and engage in corresponding slots 8–rs formed in the periphery of ribs 8r of the segments 8, the latter being located with respect to each other by means of keys or tongues engaging in grooves formed along the adjacent edge surfaces, which are parallel with the axis, as at 8k and 8g, and at right angles thereto, as at 8k' and 8g'.

As shown in Fig. 2, the number of slots 2s in the inner shell 2 of the carrying jacket agrees with the number of segments 8 of the cooled wall, one half of the slots serving for the supply and the other half for the withdrawal of cooling air.

Figs. 4 and 5 show another example of a cooled wall according to the invention for cooling the wall at both sides. The carrying jacket consists again of two cylindrical shells 11 and 12 which, together with transverse partitions 13 and 14, define channels 13a for the supply of cooling air which enters through an inlet pipe 15. Longitudinal slots 12s are provided in the inner cylindrical shell 12 which is reinforced at the edges of the slots 12s by ribs 16 and 17, Fig. 5.

A predetermined quantity of cooling air flows through the slots 12s and past directing vanes 18p provided on ribbed segments 18, which form the cooled wall, defining the space of the combustion chamber 18a. The ribbed segments 18 consist preferably of castings of heat resisting alloys. The wall of each segment 18 is composed of a series of deflectors 18d which are connected by outer ribs 18r to define slits 18s between the successive deflectors. Cooling air flows in the direction of arrows 19 through the slits 18s into the boundary layer at the heated side of the segment within the chamber 18a. The correct position of each of the segments 18 in relation to the carrying jacket is determined by means of a key 17k formed on each rib 17 and entering into a groove 18rg formed in the ribs 18r of the segment. The segments 18 are centered with respect to each other by means of cooperating keys 18k and grooves 18g formed along the edges of adjacent segments, the centering being designed in such a way as to assure at the same time the guiding of cooling air by the directing vanes 18p from the carrying jacket into the space 12a between the inner shell 12 and the wall segments 18, as indicated by the arrow 20, as well as the guiding of air through the slits 18s of the segment into the boundary layer of the combustion chamber 18a, as indicated by the arrow 21.

It is apparent from Fig. 5, that in this embodiment, the number of slots in the inner shell 12 of the carrying jacket also agrees with the number of segments 18, and that when cooling is effected at both sides of the combustion chamber wall, cooling air is supplied through all slots 12s.

Figs. 6 and 7 show by way of example further ways of positioning the ribbed segments with respect to the carrying jacket, as well as with respect to each other, such arrangements providing a particularly simple process of manufacture of the segments and also simplifying their assembly.

According to Fig. 6 the inner shell 22 of the carrying jacket is provided with slots 22s for the supply of cooling air, as indicated by the arrow 23. The shell 22 is reinforced adjacent the slot 22s by a hem or rim 24 and a welded rib 25 which is extended and curved at the inner side of the shell 22 to form a locking key 26. Each segment 27 of the cooled wall is cast to include several deflectors 29, 29a, 29b with slits 27s between them for directing the flow of cooling air into the combustion space, these deflectors being connected by a plurality of ribs 27r. A curved directing partition or vane 28 connects the ribs 27r of the segment 27 at one end of the latter, and engages the key 26, thus fixing the segments 27 in correct position. Between the partition 28 and the end deflector 29 of the related wall segment 27, a groove 27g is provided to receive a projecting portion 30p of the deflector 30 of the adjacent cooled-wall segment 31. In the ribs 32 of this segment 31, grooves 32g are provided which engage projections 28p on the partition 28 of the segment 27. The edges 32 of the ribs 31r of the segment 31 rest against the surface 25s of the rib 25 and in this way circumferentially locate the segment with respect to the carrying structure.

In Fig. 7, an arrangement similar to that of Fig. 6 is shown, and the reference numeral 33 denotes the inner shell of the carrying jacket which has a slot 33s reinforced by a hem 34 and rib 35 which protrudes again to the inner side of the shell 33 to there form a locking key 36. A locking member 38 is provided on the ribs 37r of the segment 37, and engages the locking key 36. The locking member 38 and the end deflector 39 of the related wall segment, define between them a groove 37g engaged by a projection 40p on the end deflector 40 of the neighboring segment 41. The edges 42 of the ribs 41r of this segment engage the locking key 36 for circumferentially positioning the segment.

The described arrangements are only examples of embodiments of the invention, which make possible the design and manufacture of cooled walls of combustion chambers, to ensure a long operating life under very difficult conditions of operation without the need of expensive high alloy materials. These are naturally considerable advantages which may be utilized in particular in the design of combustion chambers for stationary as well as propulsion turbines, where an increase in the weight of the structure consisting of cast members is not objectionable.

We claim:

1. In a combustion apparatus, the combination of a jacket including concentrically arranged inner and outer shells and partitions extending between said shells in radial planes perpendicular to the axis of the shells and fixedly connected to both of the latter to form a rigid, integral structure having a plurality of circumferential channels therein, a series of wall segments having ribbed outer surfaces and arranged in edge to edge relationship expansion and contraction of said wall, cooperating means on the edges of said wall segments positioning the latter with respect to each other while permitting expansion and contraction of said wall, cooperating means on said jacket and on said wall segments positioning the latter in inwardly spaced relation to said inner shell so that a space is defined between said inner shell and said wall segments while said rigid, integral structure of the jacket carries said wall defining the combustion chamber and permits said expansion and contraction of the wall, said outer shell of the jacket having at least one opening therein for admitting cooling medium to said channels, and said inner shell of the jacket having apertures therein for uniformly distributing the cooling medium from said channels to said space between the inner shell and the ribbed outer surfaces of said wall segments.

2. In a combustion apparatus, the combination of a jacket including concentrically arranged inner and outer shells and partitions extending between said shells in radial planes perpendicular to the axis of the shells and fixedly connected to both of the latter to form a rigid, integral structure having a plurality of circumferential channels therein which are segregated from each other, a series of wall segments having ribbed outer surfaces and arranged in edge to edge relationship to form a wall defining a combustion chamber, cooperating means on the edges of said wall segments positioning the latter with respect to each other while permitting expansion and contraction of said wall, cooperating means on said jacket and on said wall segments positioning the latter in inwardly spaced relation to said inner shell so that a space is defined between said inner shell and said wall segments while said rigid, integral structure of the jacket carries said wall defining the combustion chamber and permits said expansion and contraction of the wall, said outer shell of the jacket having a plurality of openings therein communicating with related channels for admitting cooling medium to certain of said related channels and for removing the cooling medium from the other related channels, and said inner shell of the jacket having the same number of apertures therein as there are wall segments, one-half of said apertures communicating with said channels for admitting cooling medium and the other half of said apertures communicating with said channels for removing cooling medium so that the cooling medium flows through said space between apertures which communicate with channels respectively admitting and removing the cooling medium.

3. In a combustion apparatus, the combination as in claim 2; wherein said apertures are located at the edges of said wall segments and alternate apertures, considered both in the directions along and around the combustion chamber, communicate with channels supplying and removing the cooling medium.

4. In a combustion apparatus, the combination of a jacket including concentrically arranged inner and outer shells and partitions extending between said shells in radial planes perpendicular to the axis of the shells and fixedly connected to both of the latter to form a rigid, integral structure having a plurality of circumferential channels therein, a series of wall segments having ribbed outer surfaces and each including a series of spaced apart deflectors defining slits therebetween, said series of wall segments being arranged in edge to edge relationship to form a wall defining a combustion chamber, cooperating means on the edges of said wall segments positioning the latter with respect to each other while permitting expansion and contraction of said wall, cooperating means on said jacket and on said wall segments positioning the latter in inwardly spaced relation to said inner shell so that a space is defined between said inner shell and said wall segments while said rigid, integral structure of the jacket carries said wall defining the combustion chamber and permits said expansion and contraction of the wall, said outer shell of the jacket having at least one opening therein for admitting cooling medium to all of said channels, and said inner shell of the jacket having aperture therein communicating with said channels for uniformly distributing the cooling medium from said channels to said space between the inner shell and the ribbed outer surfaces of said wall segments to flow through said space and pass from the latter through said slits to cool said wall segments at both sides of the latter.

5. In a combustion apparatus, the combination of a jacket including concentrically arranged inner and outer shells and partitions extending between said shells in radial planes perpendicular to the axis of the shells and fixedly connected to both of the latter to form a rigid, integral structure having a plurality of circumferential channels therein, a series of wall segments having ribbed outer surfaces and arranged in edge to edge relationship to form a wall defining a combustion chamber, cooperating means on the edges of said wall segments positioning the latter with respect to each other while permitting expansion and contraction of said wall, cooperating means on said jacket and on said wall segments positioning the latter in inwardly spaced relation to said inner shell so that a space is defined between said inner shell and said wall segments while said rigid, integral structure of the jacket carries said wall defining the combustion chamber and permits said expansion and contraction of the wall, said outer shell of the jacket having at least one opening therein for admitting cooling medium to said channels, said inner shell of the jacket having apertures therein communicating with said channels for receiving the cooling medium from the latter, and said wall segments having deflecting vanes positioned at said apertures of the inner shell to direct the flow of cooling medium from the related apertures through said space between the inner shell and the outer ribbed surfaces of the wall segments.

6. In a combustion apparatus, the combination as in claim 5; wherein said deflecting vanes form part of said cooperating means positioning the wall segments with respect to each other.

References Cited in the file of this patent

UNITED STATES PATENTS

| | | |
|---|---|---|
| 2,617,255 | Niehus | Nov. 11, 1952 |
| 2,798,661 | Willenbrock | July 9, 1957 |
| 2,815,770 | Thorp | Dec. 10, 1957 |

FOREIGN PATENTS

| | | |
|---|---|---|
| 721,209 | Great Britain | Jan. 5, 1955 |
| 264,721 | Switzerland | Feb. 1, 1950 |